2,410,314

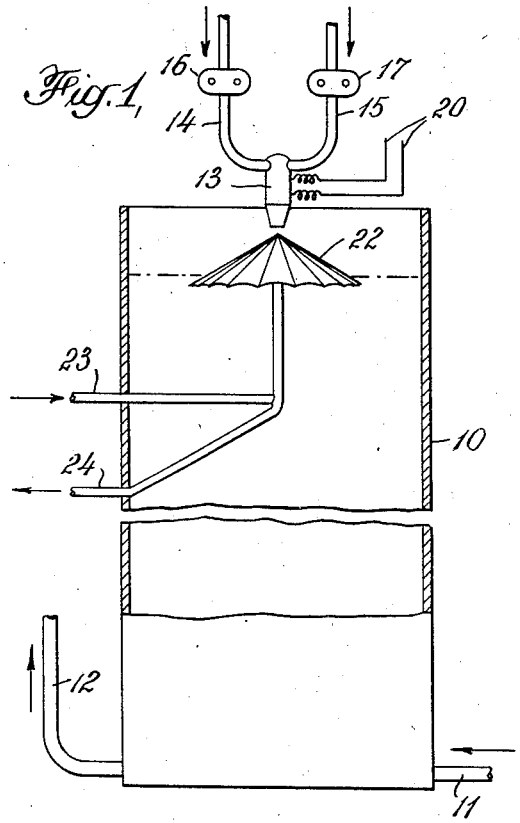
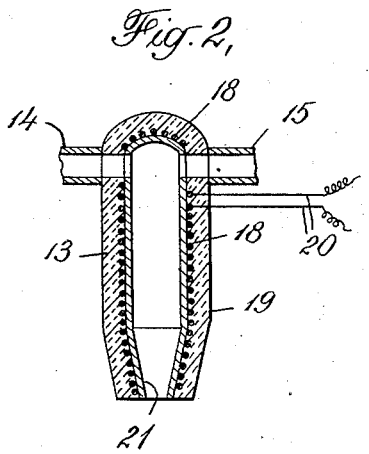
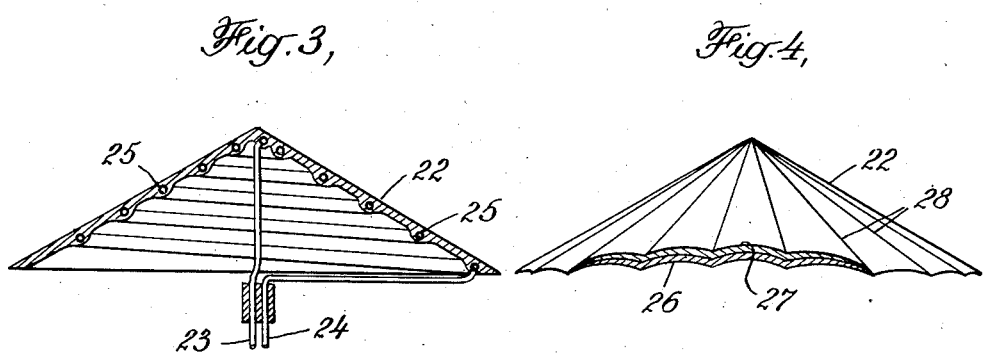
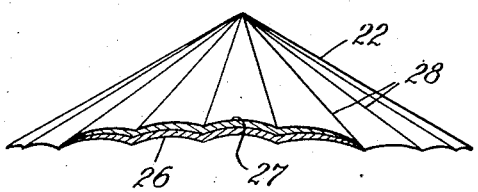
INVENTOR.
Elbert O. Sowerwine, Jr.
BY
ATTORNEY Patented Oct. 29, 1946

UNITED STATES PATENT OFFICE 2,410,314

APPARATUS FOR PREPARING FORMED GELS

Elbert O. Sowerwine, Jr., Woodbury, N. J., assignor to Socony-Vacuum Oil Company, Incorporated, a corporation of New York Application May 20, 1943, Serial No. 487,714

3 Claims. (Cl. 252—359)

This invention relates to apparatus for preparing and dividing an aqueous colloidal solution capable of setting to a gel or similar solid or semi-solid condition. More particularly, the invention contemplates the formation and subdivision of an aqueous sol which sets to form a hydrogel comprising inorganic oxides in the solid phase.

In the copending application Serial No. 461,454, filed October 9, 1942, by Milton M. Marisic, which issued as Patent No. 2,385,217, on September 18, 1945, a process is described for forming hard, spherodial beads of inorganic oxides by injecting solutions which will gel in a predetermined time into a liquid immiscible therewith and permitting gelation of resultant globules of the solution in the immiscible liquid. The resultant globules of hydrogen are then removed and processed to form the desired final product.

In operation of such processes, difficulties arise due to gelation of small portions of the solution within the mixing nozzle forming deposits of gel which gradually build up. In the said Marisic application, it is proposed to avoid this difficulty by means of a rotary cleaning member within the nozzle. Deposits can also be avoided by high velocity flow within the nozzle. The first means includes a moving member within the nozzle which occupies space and requires packing at the bearings; while high velocity flow impairs the capacity of the device to produce uniformly sized globules.

A divider for increasing the practicable capacity of a single mixing nozzle is described in application Serial No. 477,168, filed February 25, 1943, by John W. Payne, Edmund L. Sargent and Henry G. Daley. According to the disclosure of the latter application, the stream of aqueous sol issuing from a mixing nozzle is projected onto a downwardly sloping surface so formed as to divide the stream into a plurality of smaller streams. A typical and preferred form of divider is conical in shape and provided with grooves down the sides from the apex. Provision is made to discharge the stream of aqueous sol onto the apex of the cone whereby it is divided into a plurality of smaller streams, each of which is of a size to give the desired subdivision of the sol. By this means, a single nozzle may be used to provide many streams thus greatly reducing the number of nozzles required, each of which must be fitted with at least two metering pumps, or other suitable controls. In the said application, the conical divider is described as having a surface not wetted by the aqueous sol, thus preventing adherence and gelling of the sol on the divider.

My invention contemplates the provision of novel means for inhibiting gelation on or in the means for providing streams of sol supplied to a body of liquid immiscible with the sol.

In the accompanying drawing are shown a novel mixing nozzle, a novel divider and a novel combination of mixer and divider. In the drawing:

Figure 1 is a diagrammatic showing of a typical apparatus according to my invention;

Figure 2 is a view in vertical section of a mixing nozzle according to my invention;

Figure 3 is a sectional view of one form of divider contemplated by the invention; and Figure 4 is a view in partial section of another form of divider contemplated by the invention.

Briefly, the invention provides for inhibiting gelation in the mixing nozzle by heating the walls thereof to a temperature above the boiling point of the sol to thereby cause vaporization along the walls and provide a protective vapor layer which prevents gelation on the walls. The divider is provided with a surface layer of a solid having a melting point below the temperature of the sol discharged from the mixing nozzle. The sol falling on the divider melts this surface during operation and thus provides a continuously renewed surface and any gel which forms thereon is carried away by the flow of the sol. According to one modification of the invention, the divider is provided with heat exchange means whereby a coating of ice may be built up thereon by freezing of water in the sol during one phase of the operation and melted during another phase, thus continuously changing the surface without replacement of the divider at the termination of each melting step.

The time required for gelation of the sol is dependent upon the temperature of the sol, gelation time decreasng with increase in temperature. When using the combination shown in Figure 1, the sol will be heated as formed in the mixing nozzle and subsequently cooled on the divider and a balance of these factors must be made with other variables affecting gelation time, for example, acidity and concentration of the sol. It may be noted that, in general, gelation time is decreased by increasing either pH or concentration.

Referring specifically to Figure 1, a vessel 10 encloses a column of liquid immiscible with the sol, for example, mineral oil. Below the column of oil is a relatively shallow layer of water which is caused to flow by admitting fresh water at 11 and withdrawing water containing spherodial gel globles by pipe 12. Two solutions which will react to form the desired sol are admitted to a mixing nozzle 13 by pipes 14 and 15 from metering pumps 16 and 17.

The mixing nozzle 13 is constructed in such manner that heat may be applied to the inner walls thereof, as by a heat exchange medium or direct heating means. In the embodiment of Figure 2, heat is supplied by an electric heating coil 18 embedded in an outer layer 19 of insulating material. Current is supplied to the coil 18 by leads 20. The heating coil is adjacent to but insulated from a liner 21 which may advantageously be metallic. It will be apparent that solutions admitted by inlet pipes 14 and 15 will be rapidly and completely mixed inside the nozzle while the hot liner will cause a minor amount of vapor to be generated which forms a protective blanket between the liner and the contents of the nozzle. Due to the short period of residence of the aqueous fluid in the nozzle, the amount of vaporization relative to the total fluid is slight and the rise in temperature of the liquid is only a few degrees.

Upon discharge from the nozzle, the sol falls on the apex of a divider 22 which is adapted to split the stream of sol into a plurality of smaller streams. Any type of sloping surface may be used for this purpose, but best results are to be obtained by using a conical divider having a plurality of grooves down its surface from the apex. The divider is supported from the wall of vessel 10 as shown. In the embodiment illustrated, the support includes pipes 23 and 24 for circulation of a heat exchange medium to and from divider 22.

A divider provided with means for conducting a heat exchange medium in heat exchange relationship with the surface of the divider is shown in Figure 3. Tubes 25 for the heat exchange medium are formed in the divider itself whereby the surface of the divider may be cooled or heated. In Figure 4 is shown a divider having a surface formed of a substance which melts at a temperature below that of the sol supplied thereto. A metallic base 26, which may include heat exchange tubes as shown in Figure 3, is covered by a layer 27 of a meltable substance such as ice. A plurality of grooves 28 in the top surface provide paths for the small streams desired. The grooves are not essential but do give considerably smoother operation in dividing the sol. If heat exchange means are included, circulation of a fluid therethrough can be used to control melting away of the surface. In operations using the embodiment of Figure 3, which is also preferably grooved, a refrigerant may be circulated through tubes 25 until a substantial layer of ice is built up by freezing out water from the sol, whereupon the refrigerant flow is discontinued or a fluid of different temperature is circulated, permitting melting of the ice.

The surface coating of divider 22 should, in general, have a melting point below about 100° F.

I claim:

1. In an apparatus for forming and dividing a stream of a gelable sol into a plurality of smaller streams, a mixing nozzle comprising wall means defining a vertical longitudinal chamber open at the lower end, means to admit fluids to the upper end of said chamber and means to heat said wall means, and in combination with said nozzle a divider comprising means defining a conical surface with its apex below the open lower end of said chamber, said conical surface being coated with a layer of ice.

2. In an apparatus for forming and dividing a stream of a gelable sol into a plurality of smaller streams, a mixing nozzle comprising wall means defining a vertical longitudinal chamber open at the lower end, means to admit fluids to the upper end of said chamber and means to heat said wall means, and in combination with said nozzle a divider comprising means defining a conical surface with its apex below the open lower end of said chamber, said conical surface being coated with a layer of ice and means to pass a heat exchange medium in indirect heat exchange relationship with said layer of ice.

3. In an apparatus for forming and dividing a stream of a gelable sol into a plurality of smaller streams, a mixing nozzle comprising wall means defining a vertical longitudinal chamber open at the lower end, means to admit fluids to the upper end of said chamber and electrical heating means to heat said wall means, and in combination with said nozzle a divider comprising means defining a conical surface with its apex below the open lower end of said chamber, said conical surface being coated with a layer of ice.

ELBERT O. SOWERWINE, Jr.